N. W. FINCH.
DRAFT EQUALIZER.
APPLICATION FILED DEC. 17, 1913.

1,107,277.

Patented Aug. 18, 1914.

Witnesses

N. W. Finch,
Inventor by C. A. Snow & Co.
Attorneys

UNITED STATES PATENT OFFICE.

NATHAN W. FINCH, OF PLANO, ILLINOIS.

DRAFT-EQUALIZER.

1,107,277.

Specification of Letters Patent. Patented Aug. 18, 1914.

Application filed December 17, 1913. Serial No. 807,294.

*To all whom it may concern:*

Be it known that I, NATHAN W. FINCH, a citizen of the United States, residing at Plano, in the county of Kendall and State of Illinois, have invented a new and useful Draft-Equalizer, of which the following is a specification.

The present invention appertains to draft equalizers, and is more particularly an improvement over the draft equalizer disclosed in my former Patent No. 1,061,365, issued May 13, 1913.

It is the object of the present invention to provide a draft equalizer of a unique construction, for attaching a plurality of draft animals to a vehicle, plow, or the like, and which shall be so operable as to uniformly or evenly distribute the draft among the several animals without creating any excessive side draft.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawings, wherein:—

Figure 1:
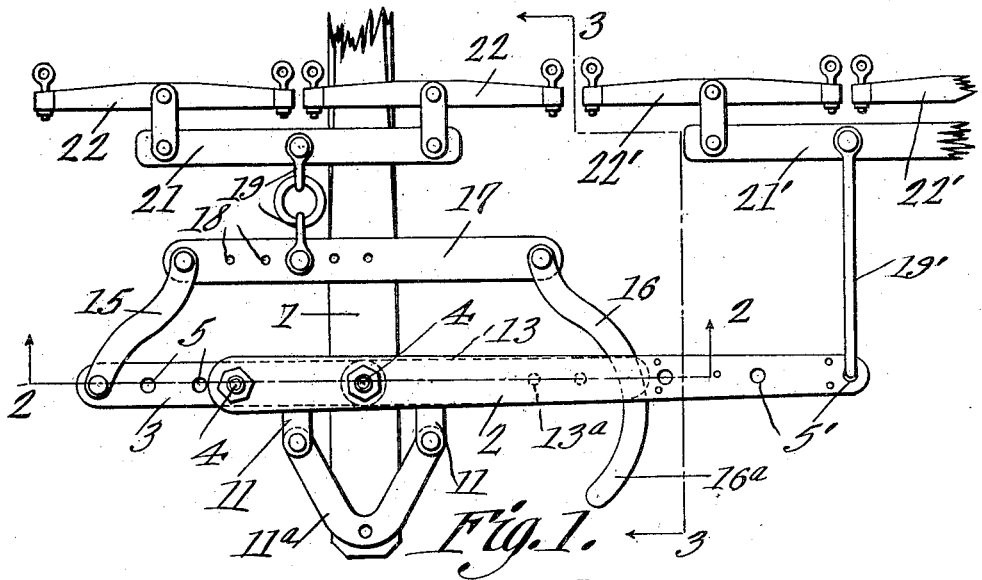
Figure 2:
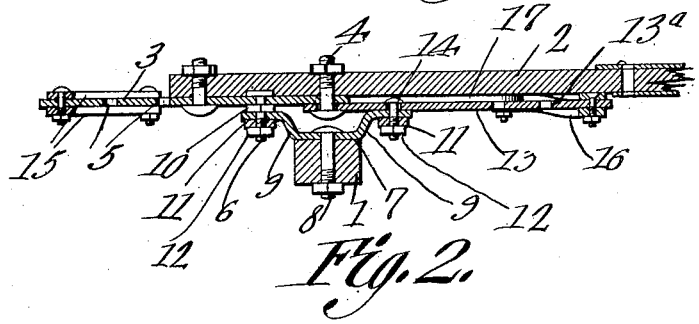
Figure 3:
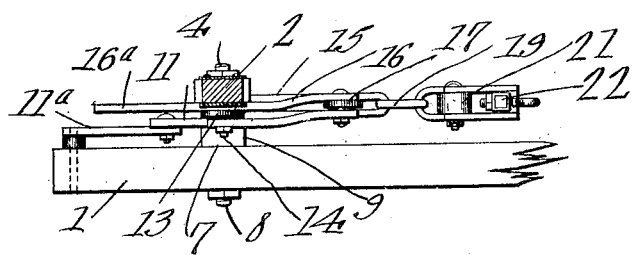

Figure 1 is a plan view of the draft equalizer, parts being broken away. Figs. 2 and 3 are sectional views taken on the lines 2—2 and 3—3 of Fig. 1, respectively.

In the drawings, the numeral 1 designates an ordinary tongue, which may be coupled or connected to a vehicle, plow, or other structure.

In carrying out the present invention, there is employed an evener bar or lever 2, which is disposed transversely over the basal or butt end portion of the tongue 1, the long arm of the lever 2 projecting to one side, and the short arm projecting to the other side, and having a metallic strip or bar 3 secured to the bottom thereof, by means of a pair of bolts or other securing members 4. The bar or strip 3 is provided with a series of apertures 5, and in reality constitutes a portion of the short arm of the equalizing lever 2. The long arm of the lever 2 has a series of apertures 5'. The fulcrum member of the equalizing lever 2, constitutes a bolt 6 which has its headed end engaged through the bar or strip 3 below the body of the lever 2, at one side of the tongue, as clearly seen in Fig. 2. This fulcrum bolt or pin 6 is pivoted to the tongue 1, in a manner as will presently appear.

A saddle or bracket bar 7 is secured laterally or transversely upon the butt end portion of the tongue 1, by means of a bolt 8, and has its ends offset upwardly, as at 9. The fulcrum pin or bolt 6 is engaged loosely through one of the offset ends 9 of the saddle or bracket 7, to fulcrum the equalizing lever 2 to the tongue, a spacing nut 10 being preferably engaged on the pin or bolt 6 between the bar or strip 3 and the respective offset end 9 of the saddle or bracket 7. A second lever 13 is employed, the same being preferably in the form of a bar or strip, and being fulcrumed adjoining one end, upon the other offset end 9 of the saddle or bracket, by means of a fulcrum bolt 14. The short arm of the lever 13 is terminally engaged to the inner bolt 4, which is disposed directly over the saddle or bracket 7, and which is carried by the long arm of the equalizing lever 2, adjoining the fulcrum of the said lever 2.

To maintain the saddle or bracket 7 against displacement about the bolt 8 as a center, links 11 are engaged to the bolts 6 and 14, and are connected to a V-shaped brace 11ª secured at its crotch to the butt end portion of the tongue 1, retaining nuts 12 being engaged on the free ends of the bolts 6 and 14 to maintain the links 11 in position upon the said bolts.

The auxiliary or supplemental lever 13 is provided with a series of apertures 13ª, along its long or free arm and links 15 and 16 are adjustably engaged to the apertures 5 and 13ª of the short and long arms of the levers 2 and 13, respectively, while a floating bar 17 is terminally pivoted to the free or forward ends of the links 15 and 16. The bar 17 has a series of apertures 18, with which a coupling means 19 is adjustably engaged, the coupling means 19 being in turn connected to the whiffle tree 21 carrying a pair of swingle trees 22. The upper link 16 has a rearwardly projecting extension 16ª for supporting the lever 2. A clevis or link 19' is adjustably attached to the apertures 5' of the long arm of the equalizing lever 2, and has attached thereto, a whiffle tree 21', carrying the swingle trees 22'.

In use, the number of swingle trees in each set may be varied according to the circumstances, the parts 19 and 19' being adjusted with respect to the respective parts 17 and 2, and the links being adjusted upon the levers 2 and 13, according to the number of swingle trees employed in the two sets.

It is evident that the draft created by the animals attached to one whiffle tree is pitted against the draft created by the draft animals attached to the other whiffle tree, so that the draft will be equalized between the two sets of draft animals. Attention is directed to the fact that the whiffle tree 21' is connected to the long arm of the lever 2, while the whiffle tree 21 is connected to the short arm of the lever 2, by the links 15, and is also connected, by means of the links 16 to the secondary lever 13, which lever has its short arm operatively connected to the long arm of the equalizing lever 2. Thus, the draft created upon the whiffle tree 21 will be transmitted in part, directly to the short arm of the equalizing lever 2, to partially counteract the draft created upon the whiffle tree 21', the remainder of the draft created upon the whiffle tree 21, being transmitted to the lever 13, in order that when the long arm of the lever 13 is drawn forwardly due to the draft, the short arm of the lever 13 will swing rearwardly to assist in counteracting the draft transmitted to the long arm of the equalizing lever 2. Conversely, the forward pull on the long arm of the equalizing lever 2, will transmit a rearward draft or strain upon the links 15, and will simultaneously swing the short arm of the lever 13 forwardly, so that the long arm of the lever 13 will be swung rearwardly to create a rearward draft upon the links 16.

By adjusting the coupling means 19 along the floating bar 17, it is evident that the draft transmitted to the short arm of the lever 2 and the long arm of the lever 13, respectively, may be regulated. Thus, by adjusting the clevis 19' with respect to the long arm of the lever 2, by adjusting the links 15 and 16 with respect to the short arm of the lever 2, and the long arm of the lever 13, respectively, and by adjusting the coupling means 19 with respect to the floating bar 17, the present device may be adjusted according to the various circumstances.

The present device is adapted for various numbers of the draft animals, and its adjustment permits the same to accommodate the various conditions which are met with in practice. The nearer the coupling means 19 is adjusted toward the links 15, the less will be the power transmitted to the lever 2, by the draft created upon the whiffle tree 21, and the closer the coupling means 19 is adjusted toward the links 16, the greater will be the draft transmitted to the lever 2 from the whiffle tree 21. This will permit the two whiffle trees to be balanced properly, according to the number of draft animals in the two sets. The apparatus will also serve to effectively distribute the draft between the two sets of draft animals, without creating any appreciable side draft.

Having thus described the invention, what is claimed as new is:—

1. In a draft equalizer, a bracket attachable to an object and having offset ends, an equalizing lever fulcrumed to one offset end thereof, a supplemental lever fulcrumed to the other offset end of the bracket and having one arm operatively engaged to one arm of the equalizing lever, draft means attached to one arm of the equalizing lever, and draft means attached to one arm of the equalizing lever and one arm of the supplemental lever.

2. In a draft equalizer, a saddle adapted to be secured upon an object, having its ends offset, an equalizing lever fulcrumed upon one of said offset ends of the saddle bar, a supplemental lever fulcrumed upon the other offset end of the saddle bar and having one arm engaged to the adjoining arm of the equalizing lever, draft means connected to the said arm of the equalizing lever, and second draft means connected to the other arm of the equalizing lever and the other arm of the supplemental lever.

3. In a draft equalizer, an equalizing lever, a supplemental lever having one arm operatively connected to one arm of the equalizing lever, a floating bar, links connecting the floating bar and certain arms of the said levers, draft means connected to the floating bar, and draft means connected to one arm of the equalizing lever.

4. In a draft equalizer, an equalizing lever, a supplemental lever having one arm operatively connected to one arm of the equalizing lever, a floating bar, links connecting the floating bar and the other arms of the said levers, and draft means adjustably connected to the said floating bar and the first mentioned arm of the equalizing lever.

In testimony that I claim the foregoing as my own, I have hereto affixed my signature in the presence of two witnesses.

NATHAN W. FINCH.

Witnesses:
G. L. BURROUGHS,
A. B. UNDERHILL.